United States Patent
Choi et al.

(10) Patent No.: US 11,622,240 B2
(45) Date of Patent: Apr. 4, 2023

(54) TEXT MESSAGE ANALYSIS AND NOTIFICATION DEVICE

(71) Applicants: HYUNDAI MOTOR COMPANY, Seoul (KR); KIA CORPORATION, Seoul (KR)

(72) Inventors: Seo Hwan Choi, Seoul (KR); Seong Soo Yae, Hwaseong-si (KR); Hyun Woo Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 46 days.

(21) Appl. No.: 17/314,899

(22) Filed: May 7, 2021

(65) Prior Publication Data
US 2022/0124461 A1 Apr. 21, 2022

(30) Foreign Application Priority Data
Oct. 20, 2020 (KR) .......... 10-2020-0136229

(51) Int. Cl.
| | |
|---|---|
| *H04W 4/06* | (2009.01) |
| *H04W 4/90* | (2018.01) |
| *G08B 21/10* | (2006.01) |
| *H04W 4/44* | (2018.01) |
| *G06F 40/30* | (2020.01) |
| *H04W 4/12* | (2009.01) |

(52) U.S. Cl.
CPC .............. *H04W 4/06* (2013.01); *G06F 40/30* (2020.01); *G08B 21/10* (2013.01); *H04W 4/12* (2013.01); *H04W 4/44* (2018.02); *H04W 4/90* (2018.02)

(58) Field of Classification Search
CPC ........... H04W 4/06; H04W 4/12; H04W 4/14; H04W 4/16; H04W 4/44; H04W 4/48; H04W 4/90; G06F 4/90; G08B 21/10
See application file for complete search history.

(56) References Cited

U.S. PATENT DOCUMENTS

| | | | |
|---|---|---|---|
| 8,989,699 B2 * | 3/2015 | Hatton ............. | G08G 1/096741 340/995.13 |
| 9,432,829 B1 * | 8/2016 | Holthausen ............. | H04W 4/12 |
| 9,756,552 B1 * | 9/2017 | Pickover ............... | G06Q 10/101 |
| 10,219,122 B1 * | 2/2019 | Scanlon ................ | H04W 4/025 |
| 2007/0008109 A1 * | 1/2007 | Wang .................... | G08B 27/008 340/539.11 |
| 2007/0139182 A1 * | 6/2007 | O'Connor ............... | H04W 4/90 340/539.22 |
| 2008/0248778 A1 * | 10/2008 | Boss ........................ | H04W 4/90 455/404.1 |

(Continued)

*Primary Examiner* — Jean A Gelin
(74) *Attorney, Agent, or Firm* — Morgan, Lewis & Bockius LLP

(57) ABSTRACT

A vehicle may include a notification type determination device configured to identify a type of a text message received through a communication terminal and determining a notification type of the text message when the type of the text message is a public warning text, a notification content determination device configured to analyze a text string of the text message and determine notification content associated with the text message when the type of the text message is the public warning text, and an output device configured to output a notification to a passenger depending on the notification type and the notification content.

20 Claims, 11 Drawing Sheets

(56) References Cited

U.S. PATENT DOCUMENTS

| | | | |
|---|---|---|---|
| 2009/0042546 A1* | 2/2009 | McClendon | G08B 27/006 455/414.1 |
| 2009/0085728 A1* | 4/2009 | Catten | H04W 48/04 340/425.5 |
| 2009/0096597 A1* | 4/2009 | Avery, Jr. | G08G 1/0962 340/459 |
| 2009/0172102 A1* | 7/2009 | Chesnutt | H04L 51/212 709/206 |
| 2010/0297980 A1* | 11/2010 | Alberth | H04W 76/50 455/404.2 |
| 2011/0124311 A1* | 5/2011 | Stahlin | H04L 67/52 455/404.2 |
| 2011/0159837 A1* | 6/2011 | Daly | H04H 20/59 455/404.1 |
| 2012/0028599 A1* | 2/2012 | Hatton | G08G 1/096775 455/404.2 |
| 2012/0302265 A1* | 11/2012 | Lei | G01C 21/3697 455/466 |
| 2013/0109344 A1* | 5/2013 | Ung | H04W 4/90 455/404.2 |
| 2013/0141278 A1* | 6/2013 | Rao | G01S 19/02 342/357.44 |
| 2015/0100197 A1* | 4/2015 | Peirce | H04W 12/08 701/31.4 |
| 2015/0120083 A1* | 4/2015 | Gurovich | G07C 5/008 701/1 |
| 2015/0266377 A1* | 9/2015 | Hampiholi | B60K 35/00 455/466 |
| 2016/0065737 A1* | 3/2016 | Williams | H04L 67/306 455/404.1 |
| 2016/0066297 A1* | 3/2016 | Borras | H04W 68/06 455/458 |
| 2016/0219431 A1* | 7/2016 | Belur | H04M 1/6091 |
| 2017/0050531 A1* | 2/2017 | Genin-Demure | G01R 31/3647 |
| 2017/0134498 A1* | 5/2017 | Mitchell | G06Q 30/0201 |
| 2019/0202479 A1* | 7/2019 | Beauvais | B60W 60/00 |
| 2020/0074772 A1* | 3/2020 | Tsuchiya | G07C 5/0816 |
| 2020/0178083 A1* | 6/2020 | Richards | H04W 72/0453 |
| 2020/0284883 A1* | 9/2020 | Ferreira | G01S 7/4817 |
| 2021/0192867 A1* | 6/2021 | Fang | G07C 5/008 |
| 2021/0284196 A1* | 9/2021 | Sorensen | G06Q 30/0645 |
| 2021/0334304 A1* | 10/2021 | Pyo | G06F 16/535 |

* cited by examiner

| IMPORTANCE | NOTIFICATION METHOD | | |
|---|---|---|---|
| | DISPLAY | INTERNAL LAMP | SPEAKER |
| LOWEST IMPORTANCE (SAFETY GUIDE TEXT) | DISPLAY TIME OF TEXT STRING: 5 SECONDS<br>DISPLAY COLOR OF TEXT STRING: ORANGE<br>DISPLAY CONTINUITY OF TEXT STRING: CONTINUITY | LIGHTING TIME: 5 SECONDS<br>LIGHTING COLOR: ORANGE<br>LIGHTING CONTINUITY: CONTINUITY | VOLUME: LOW<br>METHOD: NORMAL WARNING SOUND |
| INTERMEDIATE IMPORTANCE (URGENT DISASTER TEXT) | DISPLAY TIME OF TEXT STRING: 10 SECONDS<br>DISPLAY COLOR OF TEXT STRING: RED<br>DISPLAY CONTINUITY OF TEXT STRING: CONTINUITY | LIGHTING TIME: 10 SECONDS<br>LIGHTING COLOR: RED<br>LIGHTING CONTINUITY: CONTINUITY | VOLUME: HIGH<br>METHOD: NORMAL WARNING SOUND |
| HIGHEST IMPORTANCE (EMERGENCY DISASTER TEXT) | DISPLAY TIME OF TEXT STRING: 10 SECONDS<br>DISPLAY COLOR OF TEXT STRING: RED<br>DISPLAY CONTINUITY OF TEXT STRING: FLICKER | LIGHTING TIME: 10 SECONDS OR MORE<br>LIGHTING COLOR: RED<br>LIGHTING CONTINUITY: FLICKER | VOLUME: HIGH<br>METHOD: SPECIAL WARNING SOUND |

Fig.6

| TARGET TO BE COMPARED WITH DISASTER INFORMATION | NOTIFICATION CONTENT |
|---|---|
| CURRENT LOCATION OF VEHICLE | DETOUR ROAD ROUTE/NEARBY REST AREA GUIDE/ SURROUNDING SHELTER GUIDE |
| DESTINATION OF VEHICLE | PROPOSAL FOR CHANGING DESTINATION/PROPOSAL FOR RETURNING TO PASSENGER'S HOME/PROPOSAL FOR RECOMMENDING PLACE SIMILAR TO DESTINATION |
| PASSENGER'S HOME LOCATION | PROPOSAL FOR RETURNING TO PASSENGER'S HOME/PROPOSAL FOR CONTACTING RELATED PHONE NUMBER |

Fig.8

| ADDITIONAL INFORMATION | DETAILS |
|---|---|
| RELATED NEWS INFORMATION | LATEST NEWS INFORMATION ASSOCIATED WITH DISASTER INFORMATION<br>NEW NEWS NOTIFICATION ASSOCIATED WITH DISASTER INFORMATION |
| WEATHER INFORMATION | WEATHER INFORMATION AT DISASTER OCCURRENCE LOCATION<br>WEATHER INFORMATION IN DRIVING AREA |
| VEHICLE MANAGEMENT INFORMATION | VEHICLE PART MANAGEMENT ACCORDING TO DISASTER TYPE<br>INFORMATION ACCORDING TO DISASTER TYPE<br>FUEL MANAGEMENT ACCORDING TO DISASTER OCCURRENCE LOCATION |

Fig. 10

TEXT MESSAGE ANALYSIS AND NOTIFICATION DEVICE

CROSS-REFERENCE TO RELATED APPLICATION

This application claims the priority and the benefit of Korean Patent Application No. 10-2020-0136229, filed on Oct. 20, 2020, the entire contents of which are incorporated herein by reference.

TECHNICAL FIELD

The present disclosure relates to a vehicle that analyzes a received text message and provides a text message or information associated with the text message, and an operating method thereof.

BACKGROUND

A vehicle is equipped with various devices for the convenience of a driver or a user (hereinafter, referred to as a "passenger"). In particular, with the development of information technology (IT) technology, interactive communication and information sharing between the vehicle and a communication terminal of the passenger are important. The vehicle may be connected to the communication terminal to provide an interface and a service for the passenger's convenience.

For example, the vehicle may provide a service for notifying a passenger of a text message received through the passenger's communication terminal. However, when a simple notification of the text message is repeated, it may distract the passenger and increase the passenger's fatigue.

Also, national and local governments transmit a public warning text (a disaster text) in units of base stations through a cell broadcasting scheme. In this case, when the reception and response of the public warning text message are delayed, it may lead to a major accident or personal injury.

SUMMARY

An aspect of the present disclosure provides assistance for a passenger's quick response by identifying a type of a text message received through a communication terminal and notifying the passenger in a notification method different depending on the type when the received text message is a public warning text.

Furthermore, an aspect of the present disclosure provides a vehicle that is capable of helping a passenger's decision by analyzing a text string included in a text message to detect disaster information and notifying the passenger of information associated with the detected disaster information.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle may include a notification method determination device identifying a type of a text message received through a communication terminal and determining a notification method of the text message when the type of the text message is a public warning text, a notification content determination device analyzing a text string of the text message and determining notification content associated with the text message when the type of the text message is the public warning text, and an output device outputting a notification to a passenger depending on the notification method and the notification content.

In some forms of the present disclosure, the notification method determination device may identify the type of the text message depending on a transmission identifier of the text message.

In some forms of the present disclosure, the notification method determination device may classify importance of the text message depending on the transmission identifier and may determine the notification method of the text message depending on the importance, when the type of the text message is the public warning text.

In some forms of the present disclosure, the output device may include a display that displays the text string. The notification method determination device may determine at least one of a display time, a display color, or a display continuity of the text string depending on the importance.

In some forms of the present disclosure, the output device may include an internal lamp that is turned on in response to the text message. The notification method determination device may determine at least one of a lighting time, a lighting color, or a lighting continuity of the internal lamp depending on the importance.

In some forms of the present disclosure, the output device may include a speaker that delivers information corresponding to the text message. The notification method determination device may determine at least one of a delivery volume, a delivery method, or a delivery time depending on the importance.

In some forms of the present disclosure, the vehicle may further include driving information storage configured to store driving information about the vehicle. The notification content determination device may detect disaster information including at least one of disaster type information, disaster occurrence location information, or disaster response information, which is included in the text string, and may determine the notification content by comparing the disaster information with the driving information, when the type of the text message is the public warning text. The driving information may include at least one of a current location of the vehicle, a destination of the vehicle, or a home location of the passenger.

In some forms of the present disclosure, the notification content determination device may determine that the notification content includes at least one of a detour road route, a nearby rest area guide, or a surrounding shelter guide, when the disaster information is associated with the current location of the vehicle.

In some forms of the present disclosure, the notification content determination device may determine that the notification content includes at least one of a proposal for changing the destination, a proposal for returning to the passenger's home, or a proposal for recommending a place similar to the destination when the disaster information is associated with the destination of the vehicle.

In some forms of the present disclosure, the notification content determination device may determine that the notification content includes at least one of a proposal for returning to the passenger's home or a proposal for contacting a related phone number, when the disaster information is associated with the home location of the passenger.

In some forms of the present disclosure, the notification content determination device may detect disaster information including at least one of disaster type information, information about a disaster occurrence location, or disaster response information, which is included in the text string and may determine whether to provide additional information associated with the disaster information, when the type of the text message is the public warning text.

In some forms of the present disclosure, the additional information may include at least one of related news information, weather information, or vehicle management information. The notification content determination device may determine that the notification content includes the additional information, when the additional information is provided.

In some forms of the present disclosure, the notification content determination device may determine that the notification content includes at least one of latest news information associated with the disaster information or a notification of new news associated with the disaster information, when the additional information is the related news information.

In some forms of the present disclosure, the notification content determination device may determine that the notification content includes at least one of weather information at the disaster occurrence location or weather information in a driving area, when the additional information is the weather information.

In some forms of the present disclosure, the notification content determination device may determine that the notification content includes at least one of part management of the vehicle according to the disaster type information, parking information according to the disaster type information, or fuel management according to the disaster response information, when the additional information is the vehicle management information.

According to an aspect of the present disclosure, an operating method of a vehicle may include identifying a type of a text message received through a communication terminal, determining a notification method of the text message when the type of the text message is a public warning text, analyzing a text string of the text message when the type of the text message is the public warning text, determining notification content associated with the text message, and outputting a notification to a passenger depending on the notification method and the notification content.

In some forms of the present disclosure, the type of the text message may be identified depending on a transmission identifier of the text message. The determining of the notification method of the text message may include classifying importance of the text message depending on the transmission identifier and determining the notification method of the text message depending on the importance.

In some forms of the present disclosure, the analyzing of the text string of the text message may include detecting disaster information including at least one of disaster type information, disaster occurrence location information, or disaster response information, which is included in the text string. The determining of the notification method may include comparing the disaster information with driving information about the vehicle and determining the notification content depending on the comparison content. The driving information about the vehicle may include at least one of a current location of the vehicle, a destination of the vehicle, or a home location of the passenger.

In some forms of the present disclosure, the analyzing of the text string of the text message may include detecting disaster information including at least one of disaster type information, disaster occurrence location information, or disaster response information, which is included in the text string. The determining of the notification method may include determining whether to provide additional information associated with the disaster information and including the additional information in the notification content when the additional information is provided. The additional information may include at least one of related news information, weather information, or vehicle management information.

According to an aspect of the present disclosure, a vehicle may include a communication device accessing a communication terminal over a network, a notification method determination device receiving a public warning text received through the communication terminal and determining a notification method of the public warning text depending on a transmission identifier of the received public warning text, a notification content determination device analyzing a text string of the public warning text, detecting disaster information including at least one of disaster type information, disaster occurrence location information, or disaster response information, which is included in the text string, and determining notification content depending on the disaster information, and an output device outputting a notification to a passenger depending on the notification method and the notification content.

In some forms of the present disclosure, the notification content may include at least one of a proposal for changing a driving route of the vehicle, a proposal for managing the vehicle, or a proposal for related information about the public warning text.

DRAWINGS

The above and other objects, features and advantages of the present disclosure will be more apparent from the following detailed description taken in conjunction with the accompanying drawings:

FIG. 6 is a diagram for specifically describing a notification method in some forms of the present disclosure;

FIG. 8 is a diagram for specifically describing notification content in some forms of the present disclosure;

FIG. 10 is a diagram for specifically describing additional information in some forms of the present disclosure.

DETAILED DESCRIPTION

Figure 1:
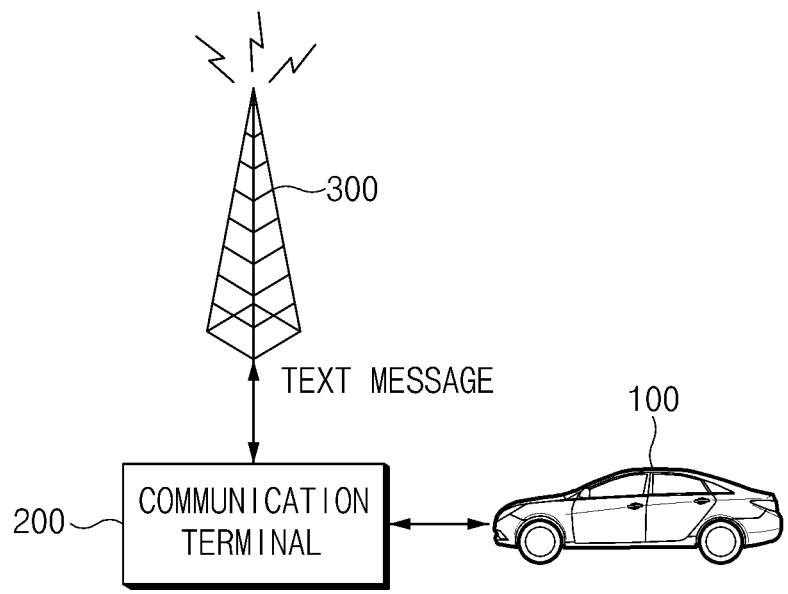
FIG. 1 is a view of a communication network of a public warning text in some forms of the present disclosure.

Hereinafter, various forms of the disclosure may be described with reference to accompanying drawings. Advantage points and features of the present disclosure and a method of accomplishing thereof will become apparent from the following description with reference to the following figures, wherein forms will be described in detail with reference to the accompanying drawings. However, this is not intended to limit the present disclosure to a specific implementation form.

The present disclosure is not limited to the form, but may be implemented in various different forms. It should be understood that the present disclosure includes various modifications, equivalents, and/or alternatives of forms of the present disclosure.

Besides, in adding reference numerals to components of each drawing, it should be noted that the same components have the same reference numerals, although they are indicated on another drawing.

In describing some forms of the present disclosure, detailed descriptions associated with well-known functions or configurations will be omitted when they may make subject matters of the present disclosure unnecessarily obscure.

In the specification, the singular forms include plural forms unless particularly mentioned. The terms "comprises" and/or "comprising" used herein does not exclude presence or addition of one or more other components, steps, operations, and/or elements in addition to the aforementioned components, steps, operations, and/or elements.

Hereinafter, operating principles and forms of the present disclosure will be described with reference to the accompanying drawings.

FIG. 1 is a view of a communication network of a public warning text in some forms of the present disclosure.

Referring to FIG. 1, a communication network system including a base station 300, a communication terminal 200 and a vehicle 100 is illustrated. The base station 300 and the communication terminal 200 may transmit and receive data through a network. The vehicle 100 may be connected to the communication terminal 200 to receive data received by the communication terminal 200 from the communication terminal 200.

The communication terminal 200 may receive a text message from the base station 300. At this time, the base station 300 may transmit a text message to the communication terminal 200 in a method including at least one of cell broadcast communication or point-to-point communication.

The cell broadcast communication refers to a mobile communication network-based broadcast type communication, and is a method of simultaneously transmitting a text message to all the communication terminals 200 within a specific zone in which the corresponding mobile communication base station 300 provides a communication service.

A public warning system may refer to a system that distributes a public safety-related message, which is provided to people by the national government through the cell broadcast communication. The public warning text (a disaster text) serviced in Korea may be transmitted through a Korea public alert system (KPAS) using the cell broadcast communication.

The point-to-point communication may refer to a method in which the base station 300 is connected to the communication terminal 200 one-to-one to transmit and receive signals. A general text message may be transmitted and received through the point-to-point communication.

The communication terminal 200 may mean a portable terminal or a communication device that is capable of transmitting and receiving a text message over a network.

Figure 2:
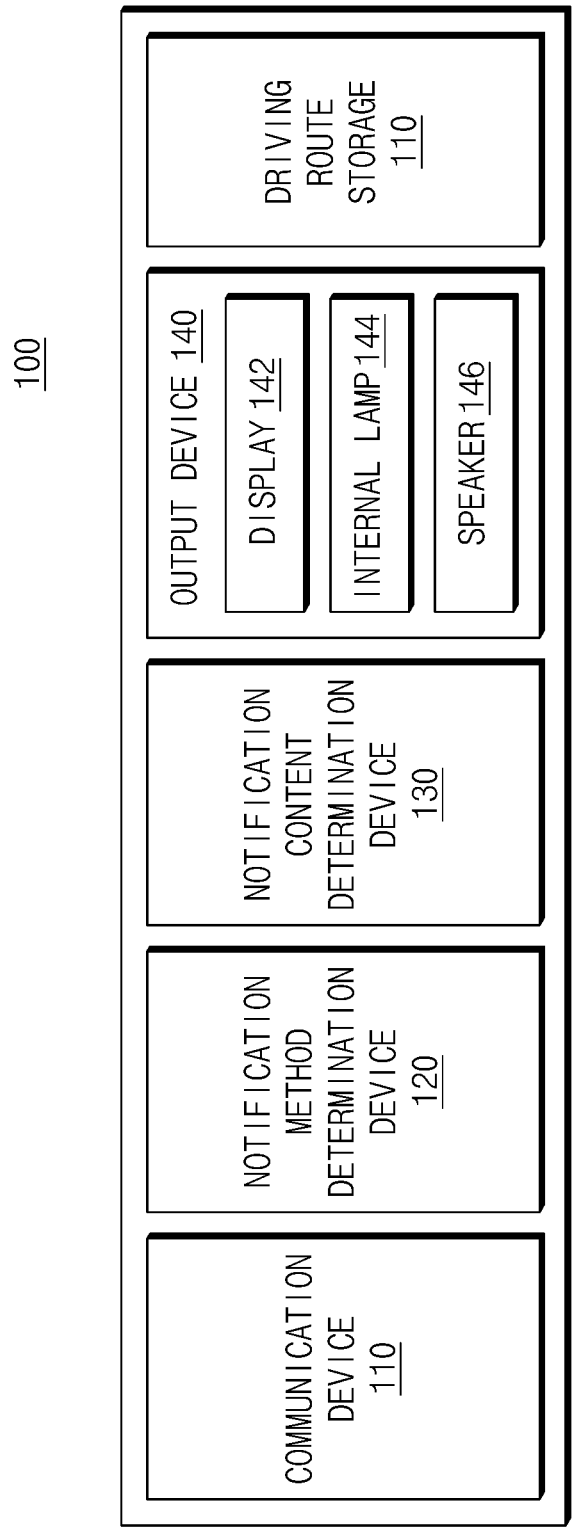
FIG. 2 is a block diagram of a vehicle in some forms of the present disclosure.

FIG. 2 is a block diagram of a vehicle in some forms of the present disclosure.

The vehicle 100 may include a communication device 110 that accesses a communication terminal, a notification method determination device 120 that identifies a type of a text message received by the communication terminal and determines a notification method of the text message, a notification content determination device 130 that analyzes a text string of the text message and determines the notification content associated with the text message when the type of the text message is a public warning text, an output device 140 that outputs a notification to a passenger depending on the notification method and the notification content, and driving route storage 150 that stores driving information of the vehicle 100.

Furthermore, the vehicle 100 may include a memory (not illustrated) for storing operating algorithms and data of the communication device 110, the notification method determination device 120, the notification content determination device 130, the output device 140, and the driving route storage 150.

The vehicle 100 may include a processor (not illustrated) that performs an operation of each of the components (e.g., the notification method determination device 120, the notification content determination device 130, and the like) included in the vehicle 100. The processor (not illustrated) and the memory (not illustrated) may be individually included in each of the components (e.g., the notification method determination device 120, the notification content determination device 130, and the like) of the vehicle 100, or may be implemented as a single device in which the processor (not illustrated) and the memory (not illustrated) are integrated with each other.

The communication device 110 may include a device that makes it possible to communicate with an external device such as the communication terminal 200. For example, the communication device 110 may include at least one of a short-range communication device, a wired communication device, or a wireless communication device.

The short-range communication device may include Bluetooth, infrared communication, and a radio frequency identification (RFID) communication device, and the like.

The wired communication device may include devices such as a controller area network (CAN), a local area network (LAN), a wide area network (WAN), and a value added network (VAN).

The wireless communication device may include a device supporting wireless communication, such as Wifi, Wireless broadband, Code Division Multiple Access (CDMA), and Long Term Evolution (LTE).

The devices are only an example. The communication device 110 may include a device supporting communication methods other than the described examples when the communication device 110 is capable of transmitting or receiving signals with the communication terminal 200.

The vehicle 100 may process the text message received through the communication terminal 200 by connecting the vehicle 100 to the communication terminal 200 through the communication device 110. The processing of the text message may include at least one of storing a text message, analyzing a text string included in the text message, or analyzing a transmission identifier of the text message.

The notification method determination device 120 may identify the type of a text message. The text message may have a transmission identifier different depending on a transmission method, a transmission subject, a transmission communication network, and a type of a message.

The transmission method may include at least one of the cell broadcasting method or the point-to-point communication method described above with reference to FIG. 1. The transmission subject may include countries, local governments, and government agencies that transmit a public warning text message, as well as a user of the text message service. The transmission communication network may mean a commercial mobile system or a separate dedicated communication network.

Text messages transmitted through a public warning system may have transmission identifiers different for each message type, respectively. The transmission identifier may conform to the standardized system for each country.

In KPAS system, public warning texts may be divided into an emergency disaster text, an urgent disaster text, and a safety guide text depending on a type. Besides, each public warning text may include a transmission identifier different depending on a type.

For example, the urgent disaster text (KPAS class 0) in KPAS system may have an identifier of 4370. Furthermore, the urgent disaster text (KPAS class 1) may have an identifier of 4371, and the safety guide text (KPAS class 1) may have an identifier of 4372.

The notification method determination device 120 may identify the type of a text message depending on a transmission identifier of the text message received through the communication terminal 200. The notification method determination device 120 may determine whether the transmission identifier included in the received text message corresponds to a transmission identifier of a public warning text.

When the transmission identifier of the received text message corresponds to the transmission identifier of the public warning text, the notification method determination device 120 may determine that the text message is the public warning text.

The notification method determination device 120 may assign importance different for each transmission identifier corresponding to each public warning text, and then may store the assigned result. When the received text message is a public warning text (alternatively, an emergency disaster text, an urgent disaster text, or a safety guide text defined in KPAS system), the notification method determination device 120 may classify the importance of the received text message depending on a transmission identifier. The emergency disaster text is a text for propagating an air-raid alarm in a war situation and may cause serious danger when the emergency disaster text is not immediately delivered to a passenger. Accordingly, the notification method determination device 120 may assign the highest importance to a transmission identifier corresponding to the emergency disaster text.

The urgent disaster text may be a text for notifying residents of evacuation information in a disaster situation or for propagating a civil defense warning. The notification method determination device 120 may assign importance, which is lower than the importance of a transmission identifier corresponding to an emergency disaster text and which is higher than the importance of a transmission identifier corresponding to a safety guide text, to a transmission identifier corresponding to the urgent disaster text.

The safety guide text may be a text for guiding safety information according to a type of a disaster. The notification method determination device 120 may assign the lowest importance to the transmission identifier corresponding to the safety guide text.

The notification method determination device 120 may match the transmission identifier with the importance assigned to the transmission identifier, and may store the matched result. When a text message is received, the notification method determination device 120 may classify the importance of the received text message by comparing the transmission identifier of the received text message with the stored transmission identifier.

The notification method determination device 120 may classify the importance of the text message depending on the transmission identifier and may determine the notification method of the text message depending on the classified importance.

When the type of the received text message is a public warning text, the notification content determination device 130 may analyze a text string included in the text message. The notification content determination device 130 may determine the notification content associated with the text message based on the analysis of the text string.

The text string may mean a natural language text including contents to be delivered to a passenger among text messages. The notification content determination device 130 may detect disaster information included in the text string by analyzing the text string included in the text message.

A method of analyzing a text string may be based on a natural language processing technology generally used to analyze a text. For example, the notification content determination device 130 may analyze a natural language included in the text string for each word, may determine whether the meaning of the word is matched with the meaning of the word stored in the notification content determination device 130, and may detect disaster information included in a text string.

The disaster information may include at least one of disaster type information, disaster occurrence location information, or disaster response information. For example, the disaster type information may include a natural disaster such as storm and flood damage, earthquakes, volcanic eruptions, and the like, a social disaster such as infectious diseases, nuclear power plant safety, electric power, communication networks, health care disasters, and the like, and a human disaster such as forest fires, leakage of hazardous chemicals, collapse of infrastructure facilities, disasters in transportation fields, and the like.

The disaster occurrence location information may include not only a location where a disaster has occurred, but also a location directly or indirectly affected because a disaster has occurred.

The disaster response information may include information about a neighboring disaster base hospital, a usage method of the neighboring disaster base hospital, and the like, as well as response information such as road control at a point in time when a disaster has occurred, access control in a specific area, and movement restrictions. Moreover, the disaster response information may include access control time due to the corresponding disaster, and a time of issuing a warning associated with a disaster, and the like.

The notification content determination device 130 may detect disaster information including at least one of disaster type information, disaster occurrence location information, or disaster response information from the text string of the text message, and may determine the notification content associated with the text message by using the detected disaster information. At this time, the notification content may be determined based on the disaster information.

The notification content may include not only content included in the text message, but also additional information associated with the disaster information.

When the type of the text message received through the communication terminal 200 is a public warning text, the notification content determination device 130 may determine the notification content by comparing driving information stored in the driving route storage 150 with the disaster information.

The driving information may include at least one of a current location of the vehicle 100, a destination of the vehicle 100, or a home location of a passenger. In addition, the driving information may include information about an optimal moving path (a driving route) for moving from the current location of the vehicle 100 to the destination 100 of the vehicle 100. In other words, the driving information may include pieces of information about a plurality of locations.

When the disaster information is associated with driving information, the notification content determination device 130 may determine that related information is notification content.

The meaning that the disaster information is associated with the driving information may mean that disaster occurrence location information or location information included in the disaster response information is within a preset distance from at least one of pieces of location information included in the driving information.

In other words, when a disaster affects the driving of the vehicle 100, the notification content determination device 130 may determine that the disaster information is associated with the driving information.

The notification content determination device 130 may determine the notification content further in consideration of time information included in the disaster response information. For example, while a vehicle is driving on the current driving route, when access to an area that the vehicle reaches within a specific time is currently restricted, but access control is released after a specific time, only the notification of current access control is provided to a passenger, and a separate proposal of a detour route may be omitted.

The notification content determined by comparing disaster information and driving information will be described in detail with reference to FIGS. 7 to 10.

The output device 140 may receive the notification method determined by the notification method determination device 120 and the notification content determined by the notification content determination device 130 to output a notification to the passenger. The output device 140 may include a plurality of means capable of outputting a notification to the passenger.

For example, the output device 140 may include a display 142, an internal lamp 144, and a speaker 146. However, this is only an example. For example, the output device 140 may output a notification to a user through various means in addition to the display 142, the internal lamp 144, and the speaker 146.

For example, the display 142 may include at least one of a navigation system, a head-up display, or a cluster. The internal lamp 144 may include an ambient mood lamp of a vehicle. The speaker 146 may include at least one of an internal audio or a piezo buzzer of the vehicle 100. Besides, the output device 140 may include an infotainment system including at least one of the display 142 or the speaker 146.

A detailed description of a notification method and notification content will be described below with reference to FIG. 4.

The driving route storage 150 may be a device for storing records of a current driving route and a previous driving route of the vehicle 100.

For example, the driving route storage 150 may store driving information. The driving information may include at least one of a current location of the vehicle 100, a destination of the vehicle 100, or a home location of a passenger in the vehicle 100.

Figure 3A:
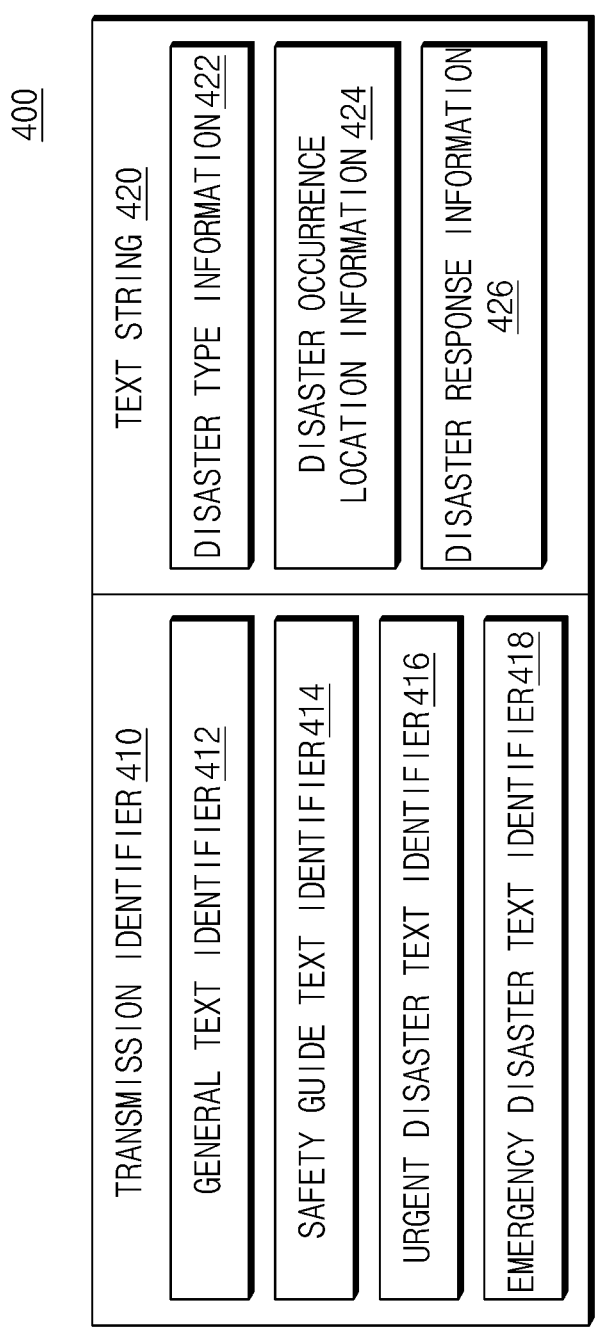
FIG. 3A is a diagram of a text message in some forms of the present disclosure.

FIG. 3A is a diagram illustrating a configuration of a text message in some forms of the present disclosure.

The types of a transmission identifier 410 and a text string 420 included in the text message 400 are illustrated with reference to FIG. 3.

The transmission identifier 410 may be an identifier allocated for the respective text message 400 to transmit and receive the text message 400. The transmission identifier 410 may vary depending on a transmission method, a transmission subject, and a transmission communication network. Hereinafter, it is described that a text message has the transmission identifier 410 different depending on the type of the text message 400.

As described above, an emergency disaster text (KPAS class 0) in KPAS system may have an identifier of 4370. Furthermore, the urgent disaster text (KPAS class 1) may have an identifier of 4371, and the safety guide text (KPAS class 1) may have an identifier of 4372.

A general text message may be transmitted by a transmission system different from KPAS system. Accordingly, the general text message may have a transmission identifier different from that of each of the public warning texts.

The transmission identifier 410 may be one of a general text identifier 412, a safety guide text identifier 414, an urgent disaster text identifier 416, and an emergency disaster text identifier 418. The general text identifier 412 may be a transmission identifier for transmitting a general text message. The safety guide text identifier 414 may be a transmission identifier for transmitting a safety guide text. The urgent disaster text identifier 416 may be an identifier for transmitting an urgent disaster text. Furthermore, the emergency disaster text identifier 416 may be an identifier for identifying an emergency disaster text.

The notification method determination device 120 may identify the type of the text message 400 received depending on the transmission identifier 410 of the text message 400 received through the communication terminal 200. In other words, when the transmission identifier 410 of the received the text message 400 is the general text identifier 412, the notification method determination device 120 may determine that the received text message 400 is not a public warning text.

The text message 400 that is a public warning text may have the transmission identifier 410 different depending on the type of a message.

As described above, the notification method determination device 120 may assign different importance to the transmission identifier 410 of the public warning text in advance and may store the assigned result.

When a public warning text is received, the notification method determination device 120 may classify importance depending on the transmission identifier 410 of the received text message 400.

The notification method determination device 120 may assign low importance to the safety guide text identifier 414. Moreover, the notification method determination device 120 may assign importance, which is higher than the safety guide text identifier 414, to the urgent disaster text identifier 416. In addition, the notification method determination device 120 may assign high importance to the emergency disaster text identifier 418.

The notification method determination device 120 may classify importance depending on the transmission identifier of the received text message 400 and may determine the notification method of the received text message 400 depending on the classified importance.

The text message 400 may include the text string 420. The text string 420 included in the text message 400 may mean a text in which information to be delivered to a passenger through the text message 400 is described in a natural language. The text string 420 may include content on at least one of disaster type information 422, disaster occurrence location information 424, or disaster response information 426.

The notification content determination device 130 may detect disaster information including at least one of the disaster type information 422, the disaster occurrence location information 424, or the disaster response information 426 from the text string 420 based on a natural language processing technology.

The disaster type information 422 may mean information indicating the type of a disaster among information included in the text string 420. For example, the disaster type may include a natural disaster, a social disaster, and a human disaster.

The notification content determination device 130 may compare a word corresponding to the type of a disaster stored in the notification content determination device 130 with a word detected in the text string 420 through the natural language processing technology and may detect the disaster type information 422 included in the text string 420.

For example, the notification content determination device 130 may store words corresponding to the natural disaster, the social disaster, and the human disaster, respectively.

The notification content of the notification content determination device 130 may vary depending on the disaster type information 422. For example, the notification content determination device 130 may determine whether to provide additional information, depending on the disaster type information 422. When the additional information is provided, the notification content determination device 130 may determine that the notification content includes the additional information.

The additional information may include at least one of related news information, weather information, or vehicle management information.

The news information may include at least one of latest news information associated with disaster information or new news notification associated with disaster information. For example, when the disaster type is a typhoon, the notification content may include the latest news including the damage status associated with the typhoon and movement route of the typhoon. The notification content may be delivered to a passenger visually and aurally through the output device 140.

For another example, when the disaster type is heavy snow, the notification content determination device 130 may determine the notification content associated with the text message to provide the passenger with information such as the usage of a snow chain as the additional information. On the other hand, when the disaster type is heavy rain, the notification content determination device 130 may determine the notification content associated with the text message to provide information about a hillside parking lot as the additional information. The disaster occurrence location information 424 may mean information about a disaster occurrence location among information included in the text string 420.

The notification content determination device 130 may compare a word corresponding to a location stored in the notification content determination device 130 with a word detected in the text string 420 through the natural language processing technology and may detect the disaster occurrence location information 424 included in the text string 420.

For example, the notification content determination device 130 may store words corresponding to a region name, a road name, a lot number, and a road number, respectively.

The notification content determination device 130 may compare a plurality of words associated with a location included in the text string 420 with words corresponding to a location stored in the notification content determination device 130 and then may specify a location at which a disaster has occurred. Additionally, the notification content determination device 130 may further use a current location of the vehicle 100 to specify the location at which a disaster has occurred.

For example, the notification content determination device 130 may compare a word for a location detected in the text string 420 of the text message 400 with a region name (a word corresponding to a location) stored in the notification content determination device 130.

When a plurality of region names the same as one another are stored in a database, the notification content determination device 130 may compare words associated with another location detected in the text string 420 with region names stored in the notification content determination device 130 and may specify a location at which a disaster has occurred.

The notification content of the notification content determination device 130 may vary depending on the disaster occurrence location information 424. For example, the notification content determination device 130 may compare driving information of the vehicle 100 with the disaster occurrence location information 424 and may determine the notification content.

The disaster response information 426 may mean information about a response to a disaster and related actions among information included in the text string 420.

The notification content determination device 130 may compare a word for a disaster response stored in the notification content determination device 130 with a word detected in the text string 420 through the natural language processing technology and may then detect the disaster response information 426 included in the text string 420.

For example, the notification content determination device 130 may store a word (e.g., warnings, watches, advisories, and the like) indicating a level of response to a disaster, a word (e.g., intensity, wind speed, rainfall, snowfall, and the like) indicating the strength of a disaster, a word (e.g., road control, access control, movement restrictions, and the like) indicating a disaster response method, and a word (e.g., a day, a month, a hour, a minute, and the like) indicating a time associated with a disaster response.

The notification content of the notification content determination device 130 may vary depending on the disaster response information 426. For example, the notification content determination device 130 may compare driving information of the vehicle 100 with the disaster response information 426 and may determine the notification content.

Figure 3B:
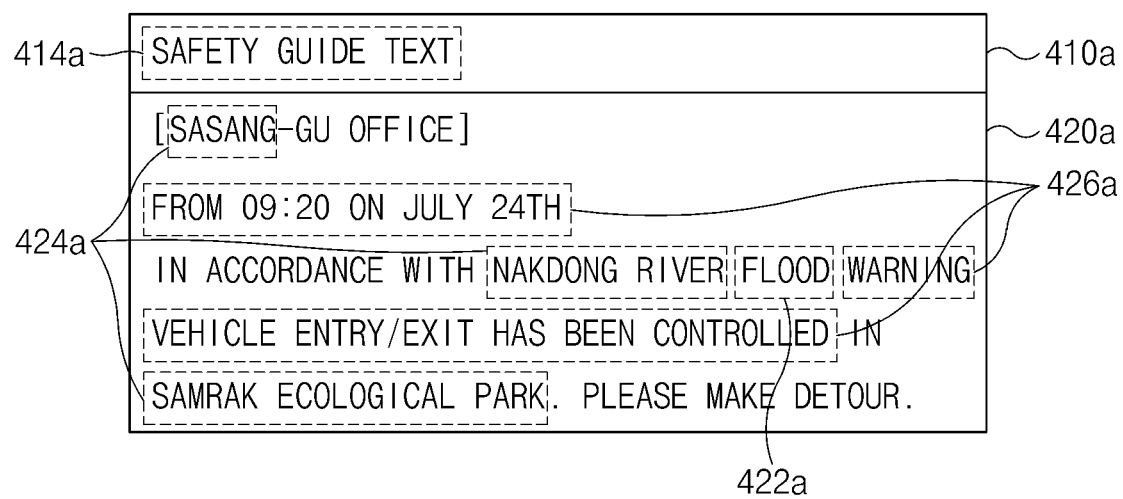
FIG. 3B is a diagram illustrating an example of a text message in some forms of the present disclosure.

FIG. 3B is a diagram illustrating an example of a text message in some forms of the present disclosure.

A text message 400*a* received by the communication terminal 200 is illustrated with reference to FIG. 3A.

The text message 400*a* may include a transmission identifier 410*a* and a text string 420*a*. The text message 400*a* illustrated in FIG. 3A may be a safety guide text and may have a safety guide text identifier 414*a* as the transmission identifier 41*a*.

The text string 420*a* included in the text message 40*a* of FIG. 3A may include disaster type information 422*a*, disaster occurrence location information 424*a*, and disaster response information 426*a*.

The notification method determination device 120 may identify the type of the text message 400*a* as a public warning text depending on the transmission identifier 410*a* of the text message 40*a*.

When the text message 400*a* is identified as a public warning text, the notification method determination device 120 may classify the importance of the text message depending on the importance assigned to the transmission identifier of each of public warning texts.

It may be determined that the text message 400*a* having a safety guide text identifier 414*a* has importance lower than a text message having an identifier of an urgent disaster text or an identifier of an emergency disaster text.

The notification method determination device 120 may determine the notification method of the text message 40*a* depending on importance.

When the notification method determination device 120 identifies the type of the text message 400*a* as a public warning text (a safety guide text), the notification content determination device 130 may detect disaster type information 422*a*, disaster occurrence location information 424*a*, and disaster response information 426*a* included in the text string 420*a*.

The notification content determination device 130 may compare a word corresponding to a type of disaster stored in the notification content determination device 130, a word corresponding to a location, or a word about disaster response, with a word detected in the text string 420*a*.

For example, the notification content determination device 130 may detect a word of "flood" from the text string 420*a* and may compare "flood" with the stored word. The notification content determination device 130 may detect the disaster type information 422*a* by comparing the stored word with the word detected in the text string 420*a*.

The notification content determination device 130 may determine the disaster type and notification content depending on the disaster type information 422*a*. In detail, when the disaster type is flood, the notification content determination device 130 may provide a passenger with a hillside parking lot as additional information, or may determine that the notification content includes a detour road route, or the like, further in consideration of other disaster information.

The notification content determination device 130 may detect a word associated with a location in the text string 420*a*. For example, the notification content determination device 130 may detect words such as 'Nakdong River', 'Samrak ecological park', 'Sasang', and the like in the text string 420*a*.

Furthermore, the notification content determination device 130 may store a word corresponding to a location, and may detect the disaster occurrence location information 424*a* by comparing the detected word with the stored word.

The notification content determination device 130 may match words of "Sasang", "Nakdong River", and "Samrak ecological park" with actual location values (e.g., latitude, longitude, and the like) of regions indicated by the words and may store the matched result. The notification content determination device 130 may detect the disaster occurrence location information 424*a* by comparing the words detected from the text string 420*a* with the stored words. The disaster occurrence location information 424*a* may include the actual location value of a region in which a disaster has occurred.

The disaster occurrence location specified by the notification content determination device 130 through a word detected in the text message 400*a* may be "Samrak ecological park, Nakdong River Basin in Sasang-gu, Busan".

When the notification content determination device 130 does not specify the actual location value of a region, in which a disaster has occurred, as the detected disaster occurrence location information 424*a*, the notification content determination device 130 may further use other words.

Referring to FIG. 3A, the notification content determination device 130 may not specify a value of a location, at which a disaster has occurred, with only the word "Nakdong River". Accordingly, the notification content determination device 130 may detect the disaster occurrence location information 424*a* by further using 'Sasang' and 'Samrak ecological park'.

In addition, the notification content determination device 130 may further use the current location of the vehicle 100 to specify a value of a location where a disaster has occurred.

The notification content determination device 130 may detect the words "from 09:20 on July 24th", "warning", and "vehicle entry/exit has been control" in the text string 420*a*. The notification content determination device 130 may store a word (warning) indicating a level of a response to a disaster, a word (vehicle entry/exit control) indicating a disaster response method, and a word (July 24 at 09:20) indicating a time associated with a disaster response, and may detect the disaster response information 426*a* by comparing stored words with words detected in the text string 420*a*.

The notification content determination device 130 may determine the notification content depending on the disaster response information 426*a*.

In particular, the notification content determination device 130 may determine that the notification content includes a proposal of a detour road route, or the like, in consideration of the time information, vehicle entry/exit control information and the disaster occurrence location information 424*a*, which are included in the disaster response information 426*a*. Upon proposing a detour route, the notification content determination device 130 may determine the notification content in consideration of driving information of the vehicle 100 stored in the driving route storage 150.

Figure 4:
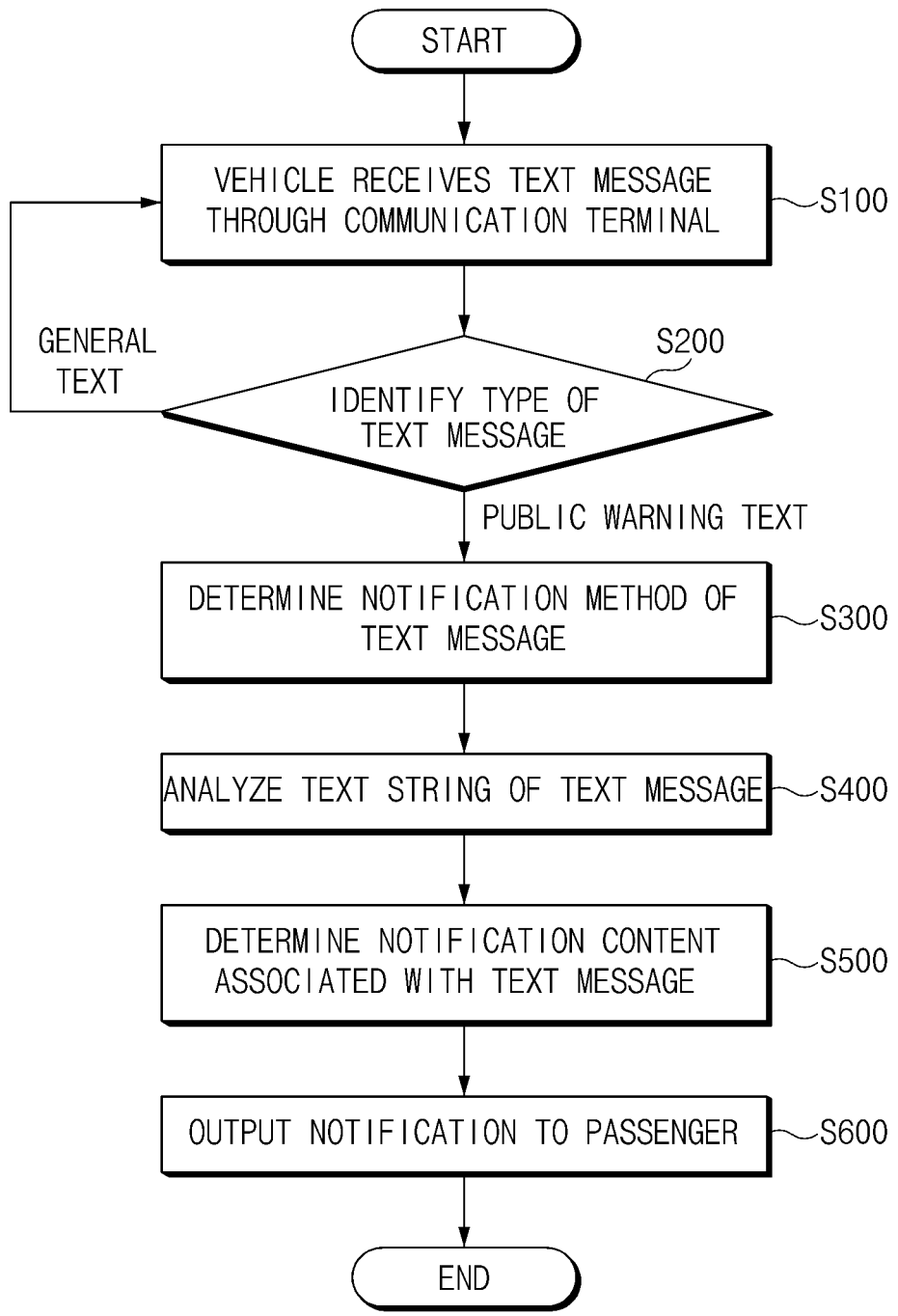
FIG. 4 is a flowchart for describing an operating method of a vehicle in some forms of the present disclosure.

FIG. 4 is a flowchart for describing an operating method of a vehicle in some forms of the present disclosure.

Referring to FIG. 4, the vehicle 100 receives a text message through the communication terminal 200 connected to the vehicle 100 (S100).

The vehicle 100 may identify the type of the received text message (S200).

The received text message may have a transmission identifier among a plurality of transmission identifiers. In particular, the notification method determination device 120 included in the vehicle 100 may identify the type of a text message depending on a transmission identifier.

The text message may be divided into a general text and a public warning text. The general text may mean all text messages other than the public warning text. The general text may be all text messages having transmission identifiers other than a transmission identifier corresponding to a public warning text.

In other words, the notification method determination device 120 may identify the type of the received text message by determining whether the transmission identifier of the received text message corresponds to the transmission identifier of the public warning text.

The notification method determination device 120 may identify the type of the text message. When the text message is a public warning text, the notification method determination device 120 may determine a notification method of a text message (S300).

The notification method determination device 120 may classify the importance of the text message depending on the type of the transmission identifier and may determine the notification method of the text message depending on importance.

The text message may be delivered to a passenger by using a visual method, an audible method, and other means. The notification method determination device 120 may determine a notification method through the output device 140 included in the vehicle 100.

When the notification method of the text message is determined, the notification content determination device 130 may analyze a text string of a text message (S400).

When the text message is a public warning text and the notification method of the text message is determined, the notification content determination device 130 may analyze the text string included in the text message. The notification content determination device 130 may detect disaster information by comparing a word included in the text message with a word stored in the notification content determination device 130.

The text string may be analyzed based on a natural language processing technology. In detail, the text string may be analyzed by detecting a word included in the text string and comparing the detected word with the word stored in the notification content determination device 130.

The notification content determination device 130 may analyze the text string by comprehensively determining the relationship between words included in the text string, not only whether the detected word is identical to a word stored in the database.

The disaster information may include at least one of disaster type information or disaster occurrence location information (S400).

The notification content determination device 130 may determine the notification content associated with the text message by using the text string analysis result (S500).

The notification content determination device 130 may determine the notification content associated with the text message by using disaster information included in the text string analysis result. The notification content determination device 130 may determine notification content associated with a text message by using not only disaster information, but also driving information about the vehicle 100.

When the notification content is determined, the vehicle 100 may output the notification content to the passenger (S600).

The vehicle 100 may output a notification to the passenger through the output device 140. For example, the vehicle 100 may output a notification by selectively using the display 142, the internal lamp 144, or the speaker 146, or may output a notification by simultaneously using the display 142, the internal lamp 144, or the speaker 146. The notification method may be determined depending on the importance of the text message. The output method of a notification may vary depending on the notification method and notification content.

Figure 5:
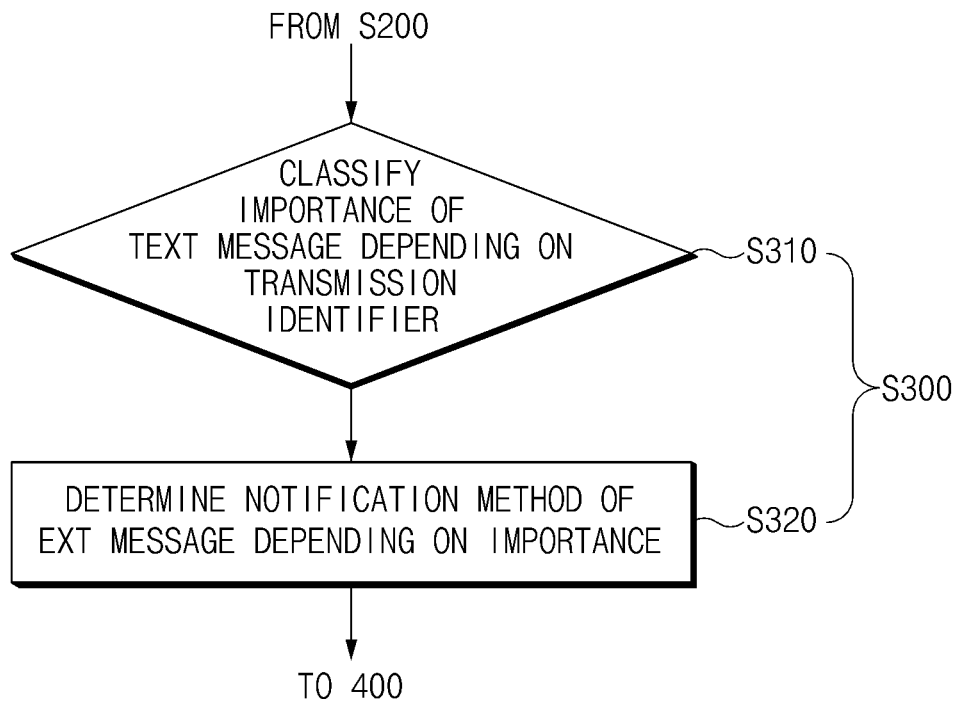
FIG. 5 is a flowchart for describing an operating method of a notification method determination device in some forms of the present disclosure.

FIG. 5 is a flowchart for describing an operating method of a notification method determination device in some forms of the present disclosure.

When the text message is a public warning text, the notification method determination device 120 may classify the importance of a text message depending on a transmission identifier (S310). In accordance with KPAS, the public warning text may include a safety guide text, an urgent disaster text, and an emergency disaster text. In addition, the public warning text may have a transmission identifier different depending on importance.

The notification method determination device 120 may assign importance different for each transmission identifier corresponding to each public warning text, and then may store the assigned result. Furthermore, when the text message is a public warning text, the notification method determination device 120 may classify the importance of the text message depending on a transmission identifier.

For example, in KPAS system, the transmission identifier of the emergency disaster text may be 4370; the transmission identifier of the urgent disaster text may be 4371; and, the transmission identifier of the safety guide text may be 4372. The notification method determination device 120 may assign and store the highest importance to the transmission identifier of 4370, and may assign, to the transmission identifier of 4371, importance between importance assigned to the transmission identifier of 4370 and importance assigned to the transmission identifier of 4372. The notification method determination device 120 may assign the lowest importance to the transmission identifier of 4372.

When the transmission identifier of the received text message is 4370, the notification method determination device 120 may classify the received text message as a text message having the highest importance. Moreover, when the transmission identifier is 4371, the notification method determination device 120 may classify the received text message as a text message having an intermediate importance. When the transmission identifier is 4372, the notification method determination device 120 may classify the received text message as a text message having low importance.

The notification method determination device 120 may determine a notification method of the text message depending on importance (S320). Besides, the notification method determination device 120 may determine which means a text message is provided to a passenger through from among means included in the output device 140.

FIG. 6 is a diagram for specifically describing a notification method in some forms of the present disclosure.

When a public warning text is received, a notification may be output to a passenger through the output device 140. The output device 140 may include the display 142, the internal lamp 144, and the speaker 146. However, the output device 140 may further include a means capable of outputting a notification to the passenger in addition to the devices.

In some forms of the present disclosure, the display 142 may output a notification to a passenger in a method of displaying a text string through a screen. The display 142 may include a navigation device for a vehicle and a head-up display.

The notification method determination device 120 may determine a notification method of the text message through the display 142 depending on the importance of the received text message. The notification method determination device 120 may determine at least one of a display time, a display color, or a display continuity of the text string depending on importance.

For example, when the importance is lowest (a safety guide text), the display time of the text string may be determined as 5 seconds; the display color of the text string may be determined as orange; and, the display continuity of the text string may be determined as "continuity". When the importance is intermediate (an urgent disaster text), the display time of the text string may be determined as 10 seconds; the display color may be determined as red; and, the display continuity of the text string may be determined as "continuity". Also, when the importance is highest (an emergency disaster text), the display time of the text string may be determined as 10 seconds; the display color of the text string may be determined as red; and, the display continuity of the text string may be determined to be displayed through a flicker.

The display method of text string through the display 142 is only an example. In addition to the above-described method, a text string may be displayed through the display 142 in various manners.

The display 142 may display a text string of a text message received through the communication terminal 200 as it is. In some forms of the present disclosure, the display 142 may selectively display a text string including disaster information analyzed through the notification content determination device 130.

In some forms of the present disclosure, the internal lamp 144 may output a notification to a passenger in a method of turning on the internal lamp 144 in response to a text message. The internal lamp 144 may include an ambient lamp, an internal mood lamp, or the like.

The notification method determination device 120 may determine a lighting method of the internal lamp 144, which is turned on in response to the text message, depending on the importance of the text message. The notification method determination device 120 may determine at least one of a lighting time, a lighting color, or a lighting continuity of the internal lamp depending on the importance of the text message.

For example, when the importance is lowest (a safety guide text), the lighting time of the internal lamp 144 may be determined as 5 seconds; the lighting color of the internal lamp 144 may be determined as orange; and, the lighting continuity of the internal lamp 144 may be determined as continuity. When the importance is intermediate (an urgent guide text), the lighting time of the internal lamp 144 may be determined as 10 seconds; the lighting color of the internal lamp 144 may be determined as red; and, the lighting continuity of the internal lamp 144 may be determined as continuity. Besides, when the importance is highest (an emergency guide text), the lighting time of the internal lamp 144 may be determined as 10 seconds; the lighting color of the internal lamp 144 may be determined as red; and, the lighting continuity of the internal lamp 144 may be determined as a flicker.

The internal lamp 144 may help a passenger intuitively perceive the importance of a text message by changing the lighting method corresponding to the text message depending on the importance of the text message.

In some forms of the present disclosure, the speaker 146 may deliver information corresponding to a text message to a passenger through an auditory method. The speaker 146 may include an internal audio, a piezo buzzer, and the like.

The notification method determination device 120 may determine a notification method of the text message through the speaker 146 depending on the importance of the text message. The notification method determination device 120 may determine at least one of a delivery volume, a delivery method, or a delivery time depending on importance.

In some forms of the present disclosure, the notification method determination device 120 may provide a notification of a text message through a buzzer. When the importance is lowest (a safety guide text), the delivery volume may be determined to be low, and the delivery method may be determined as a normal warning sound. When the importance is intermediate (an urgent guide text), the delivery volume may be determined to be high, and the delivery method may be determined as a normal warning sound. Furthermore, when the importance is highest (an emergency disaster text), a delivery volume may be determined to be high, and a delivery method may be determined as a special warning sound such that a passenger is capable of intuitively perceiving a danger.

In some forms of the present disclosure, the notification method determination device 120 may provide a notification of a text message through a text-to-speech method. When a text message is provided to a passenger in a text-to-speech method, the notification method determination device 120 may determine a notification method depending on the importance of the text message, by changing a delivery volume or changing a delivery voice.

When a text message is provided in a text-to-speech method, the speaker 146 may deliver a text string of a text message as it is, or may selectively deliver a text string including disaster information analyzed through the notification content determination device 130.

The method of delivering information through the speaker 146 is only an example. In addition to the above-described method, information corresponding to the text message may be delivered through the speaker 146 in various manners.

Figure 7:
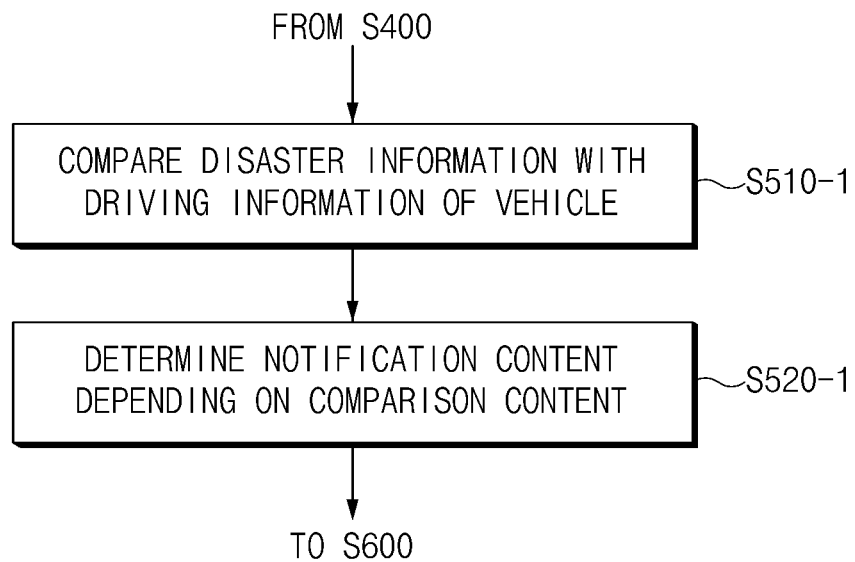
FIG. 7 is a flowchart for describing an operating method of a notification content determination device in some forms of the present disclosure.

FIG. 7 is a flowchart for describing an operating method of a notification content determination device in some forms of the present disclosure.

In some forms of the present disclosure, the notification content determination device 130 may compare the detected disaster information with driving information of a vehicle (S510-1).

The driving information of the vehicle may be information stored in the driving route storage 150. The driving information may include at least one of a current location of the vehicle, a destination of the vehicle, or a home location of a passenger.

The notification content determination device 130 may determine the notification content depending on the result of comparing between the driving information of the vehicle and the disaster information (S520-1).

The notification content determination device 130 may determine the notification content by comprehensively comparing the driving information and the disaster information. For example, the notification content determination device 130 may determine whether location information included in disaster occurrence location information or location information included in disaster response information is within a preset distance from location information included in the driving information, based on a current location of the vehicle 100 and the destination of the vehicle 100 that are included in the driving information.

Furthermore, the notification content determination device 130 may determine the notification content further in consideration of access control time information due to the occurrence of a disaster included in the disaster response information. For example, when control is released at the time when the vehicle 100 arrives in a controlled area although there is a disaster control area on the driving route of the vehicle 100, the notification content may not include whether there is access control.

FIG. 8 is a diagram for specifically describing notification content in some forms of the present disclosure.

A target to be compared with disaster information and notification content are illustrated in FIG. 8.

In some forms of the present disclosure, the target to be compared with the disaster information may be driving information. The notification content determination device 130 may compare disaster information with driving information to determine the notification content depending on the comparison content.

When the disaster information is associated with the current location of the vehicle 100, the notification content determination device 130 may determine that the notification content includes at least one of a detour road route, a nearby rest area guide, or a surrounding shelter guide.

The meaning that the disaster information is associated with the current location of the vehicle 100 may mean that a disaster occurrence location or a road control area is within a preset distance from the current location of the vehicle 100. When the current location is a location capable of being affected by a disaster, the notification content determination device 130 may determine that disaster information is associated with the current location of the vehicle 100.

The notification content determination device 130 may determine the notification content in consideration of whether the disaster type is associated with the current location.

For example, when the type of a disaster is localized heavy rain, when a landslide caution area or a rain hazard section is within a preset distance from the current location of the vehicle 100 although the current location of the vehicle 100 is not within a preset distance from a disaster occurrence location or a control area, the notification content determination device 130 may determine that the notification content includes at least one of a detour road route, a nearby rest area guide, or a surrounding shelter guide.

When the disaster information is associated with the current location of the vehicle 100, the notification content determination device 130 may determine the guide content to help the vehicle 100 quickly leave the current location.

When the disaster information is associated with the destination of the vehicle 100, the notification content determination device 130 may determine that the notification content includes at least one of a proposal for changing a destination, a proposal for returning to the passenger's home, or a proposal for recommending a place similar to the destination.

The meaning that the disaster information is associated with the destination of the vehicle 100 may mean that a disaster occurrence location or a road control area is within a preset distance from the destination of the vehicle 100. When the destination is a location capable of being affected by a disaster, the notification content determination device 130 may determine that disaster information is associated with the destination of the vehicle 100.

The notification content determination device 130 may determine the notification content in consideration of whether the disaster type is associated with the destination.

For example, when a storm watch or tsunami warning is issued, although the destination of the vehicle 100 is not within a preset distance from the disaster occurrence location or control area, the notification content determination device 130 may determine that the notification content includes at least one of a proposal for changing a destination, a proposal for returning to the passenger's home, or a proposal for recommending a place similar to the destination.

When the disaster information is associated with the destination of the vehicle 100, the notification content determination device 130 may determine the guide content that induces the vehicle 100 to change the destination.

When the disaster information is associated with the passenger's home location, the notification content determination device 130 may determine that the notification content includes at least one of a proposal for returning to the passenger's home or a proposal for contacting a related phone number.

The meaning that the disaster information is associated with the passenger's home location may mean that a disaster occurrence location or a road control area is within a preset distance from the passenger's home location. When the passenger's home location is a location capable of being affected by a disaster, the notification content determination device 130 may determine that disaster information is associated with the passenger's home location.

The notification content determination device 130 may determine the notification content in consideration of whether the disaster type is associated with the passenger's home location.

The related phone number may be a number including at least one of family of the passenger, acquaintance phone number, or the management company of the passenger's house. The related phone number may be a number stored in the notification content determination device 130 or may be a number stored in the communication terminal 200.

Figure 9:
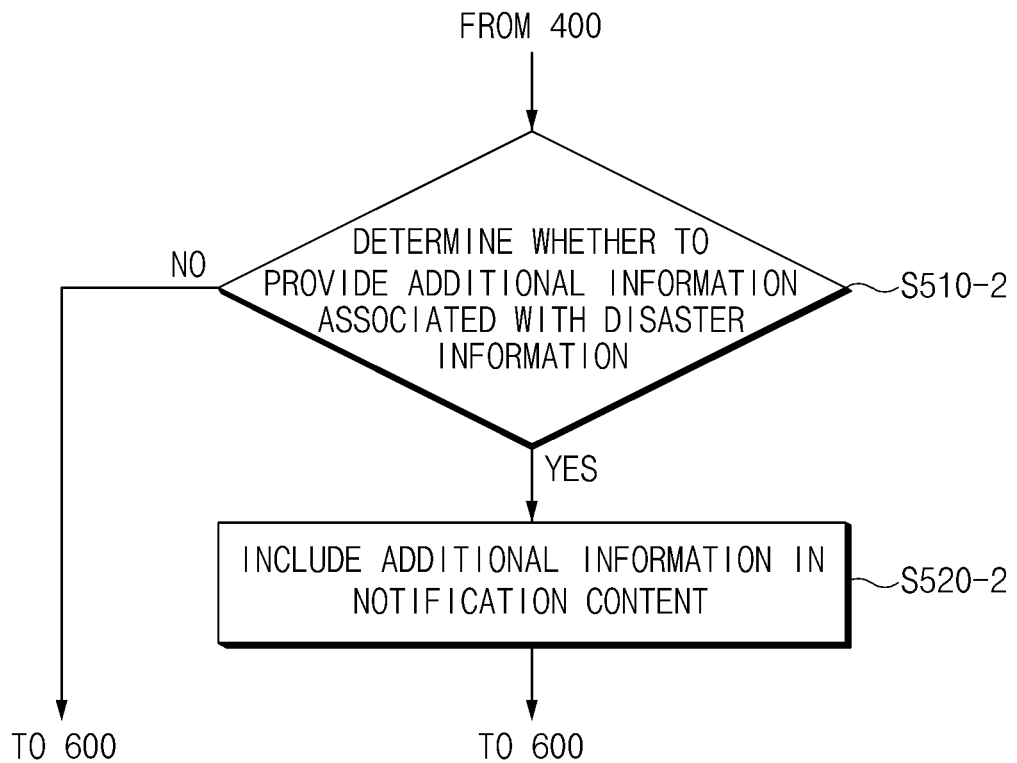
FIG. 9 is a flowchart illustrating an additional information providing operation of a notification content determination device in some forms of the present disclosure.

FIG. 9 is a flowchart illustrating an additional information providing operation of a notification content determination device in some forms of the present disclosure.

When the text message is a public warning text and the notification method of the text message is determined, the notification content determination device 130 may analyze the text string included in the text message. In detail, the analyzing of the text string may mean detecting disaster information including at least one of disaster type information or disaster occurrence location information, which is included in the text string of the text message (S400).

The notification content determination device 130 may detect disaster information by comparing information stored in a database with a text string detected in a text message.

In some forms of the present disclosure, the notification content determination device 130 may determine whether to provide additional information associated with the detected disaster information (S510-2).

The additional information may be information stored in the notification content determination device 130, or may be information transmitted from an external device (e.g., the communication terminal 200, or the like) of the vehicle 100.

When the additional information associated with the disaster information is referenced together with the disaster information, the additional information associated with the disaster information may mean information that helps a passenger drive and manage the vehicle 100.

The additional information may include at least one of related news information, weather information, or vehicle management information. The notification content determination device 130 may determine whether to notify the additional information, by comprehensively determining the disaster information.

When notifying the passenger of the additional information, the notification content determination device 130 may determine that additional information is included in the notification content (S520-2).

For convenience of description, although divided operations of the notification content determination device 130 is described with reference to FIGS. 7 and 9. However, the notification content determination device 130 may determine the notification content, using the notification content determination method described in FIG. 7 and the notification content determination method described in FIG. 9 together.

In other words, the notification content determination device 130 may determine the notification content by comparing the disaster information with the driving information of the vehicle. As such, the notification content determination device 130 may determine whether to provide the additional information associated with the disaster information and may determine that the notification content includes the additional information.

The notification content determination device 130 may determine the notification content through at least one of the notification content determination method described in FIG. 7 or the notification content determination method described in FIG. 9.

Furthermore, the notification content determination device 130 may determine the notification content through the notification content determination method described in FIG. 7, and then may determine the notification content through the notification content determination method described in FIG. 9. On the other hand, the notification content determination device 130 may determine the notification content through the notification content determination method described in FIG. 9 and then may determine the notification content through the notification content determination method described in FIG. 7. FIG. 10 is a diagram for specifically describing additional information in some forms of the present disclosure.

Additional information and details of the additional information are described with reference to FIG. 10.

When the additional information is news information associated with disaster information, the news information associated with the disaster information may include at least one of latest news information associated with the disaster information or a notification of new news associated with the disaster information.

The notification content determination device 130 may determine that news information including information matched with the disaster information among pieces of news information obtained through an external network is news associated with the disaster information.

The notification content determination device 130 may determine that the notification content includes news information as the additional information, thereby helping a passenger drive the vehicle 100.

The latest news information associated with the disaster information and the notification of new news associated with the disaster information may be delivered via voice. When being delivered via voice, the notification may be delivered to a passenger via the speaker 146.

When the additional information is weather information associated with the disaster information, the weather information may include at least one of weather information at a disaster occurrence location or weather information in a driving area.

The notification content determination device 130 may obtain weather information for each region over an external network. The notification content determination device 130 may determine that the notification content includes weather information at the disaster occurrence location, thereby helping a passenger drive the vehicle 100.

Besides, the notification content determination device 130 may notify a passenger of weather information in a driving area. The driving area may include not only a current location of the vehicle, but also an area on a driving route of the vehicle and an area within a preset distance from the current location of the vehicle. The weather information may be output through the display 142.

The notification content determination device 130 may determine that the notification content includes vehicle management information, to additionally provide a passenger with information about the components of the vehicle 100 and vehicle management information based on disaster information.

The vehicle management information may include vehicle part management information according to a disaster type, parking information according to the disaster type, and fuel management information according to the disaster occurrence location.

The notification content determination device 130 may determine whether the management of a vehicle is necessary based on disaster information including at least one of disaster type information, disaster occurrence location information, or disaster response information.

For example, when the disaster type is heavy snow, the notification content determination device 130 may determine that the notification content includes a vehicle tire condition check or a snow tire replacement.

Moreover, when it is determined based on the disaster occurrence location information that the disaster occurrence location is within a preset distance from the destination, the passenger may be advised to refuel the vehicle 100 before reaching the destination.

In another example, when the disaster type is heavy rain, the notification content determination device 130 may induce a passenger to park the vehicle 100 in a place where the vehicle 100 is prevented from being flooded, by including parking information in the notification content.

Hereinabove, although some forms of the present disclosure have been described with reference to the accompanying drawings, it will be understood by those skilled in the art to which the present disclosure pertains that the present disclosure can be carried out in other detailed forms without changing the technical spirits and essential features thereof. Therefore, some forms of the present disclosure are exemplary in all aspects, and should be construed not to be restrictive.

According to a vehicle and an operating method of the vehicle disclosed in the present disclosure, it is possible to prevent a passenger's distraction and to help a quick response according to a type of a text message, by identifying a type of a received text message and changing a notification method depending on a type of a text message to deliver the received text message to the passenger.

In addition, it is possible to improve the passenger's vehicle driving convenience and the quality of service, by detecting disaster information from a text string of the received text message to provide related information.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A vehicle comprising:
a notification type determination device configured to:
identify a type of a text message received through a communication terminal; and determine a notification type of the text message when it is identified that the type of the text message is a public warning text;
a notification content determination device configured to:
analyze a text string of the text message; and
determine notification content associated with the text message when it is identified that the type of the text message is the public warning text;
detect disaster information included in the text string; and
determine whether to provide additional information associated with the disaster information;
an output device configured to output a notification to a passenger depending on the notification type and the notification content.

2. The vehicle of claim 1, wherein the notification type determination device is configured to:
identify the type of the text message depending on a transmission identifier of the text message.

3. The vehicle of claim 2, wherein the notification type determination device is configured to:
classify importance of the text message depending on the transmission identifier; and
determine the notification type depending on the importance when it is identified that the type of the text message is the public warning text.

4. The vehicle of claim 3, wherein:
the output device includes a display that is configured to display the text string, and
the notification type determination device is configured to determine at least one of a display time, a display color, or a display continuity of the text string depending on the importance.

5. The vehicle of claim 3, wherein:
the output device includes an internal lamp that is configured to activate in response to the text message, and
the notification type determination device is configured to determine at least one of a lighting time, a lighting color, or a lighting continuity of the internal lamp depending on the importance.

6. The vehicle of claim 3, wherein:
the output device includes a speaker that is configured to deliver information corresponding to the text message, and
the notification type determination device is configured to determine at least one of a delivery volume, a delivery method, or a delivery time depending on the importance.

7. The vehicle of claim 1, further comprising:
driving information storage configured to store driving information representing the vehicle,
wherein the disaster information includes at least one of disaster type information, disaster occurrence location information, or disaster response information, and
wherein the notification content determination device is configured to:
detect the disaster information; and
determine the notification content by comparing the disaster information with the driving information when it is identified that the type of the text message is the public warning text, and
wherein the driving information includes at least one of a current location of the vehicle, a destination of the vehicle, or a home location of the passenger.

8. The vehicle of claim 7, wherein the notification content determination device is configured to:
determine that the notification content includes at least one of a detour road route, a nearby rest area guide, or a surrounding shelter guide when the disaster information is associated with the current location of the vehicle.

9. The vehicle of claim 7, wherein the notification content determination device is configured to:
determine that the notification content includes at least one of a proposal for changing the destination, a proposal for returning to the passenger's home, or a proposal for recommending a place similar to the destination when the disaster information is associated with the destination of the vehicle.

10. The vehicle of claim 7, wherein the notification content determination device is configured to:
determine that the notification content includes at least one of a proposal for returning to the passenger's home or a proposal for contacting a related phone number when the disaster information is associated with the home location of the passenger.

11. The vehicle of claim 1, wherein
disaster information includes at least one of disaster type information, information about a disaster occurrence location, or disaster response information.

12. The vehicle of claim 11, wherein the notification content determination device is configured to:
determine that the notification content includes the additional information when the additional information is provided, wherein the additional information includes at least one of related news information, weather information, or vehicle management information.

13. The vehicle of claim 12, wherein the notification content determination device is configured to:
determine that the notification content includes at least one of latest news information associated with the disaster information or a notification of new news associated with the disaster information when the additional information is the related news information.

14. The vehicle of claim 12, wherein the notification content determination device is configured to:
determine that the notification content includes at least one of weather information at the disaster occurrence location or weather information in a driving area when the additional information is the weather information.

15. The vehicle of claim 12, wherein the notification content determination device is configured to:
determine that the notification content includes at least one of part management of the vehicle according to the disaster type information, parking information according to the disaster type information, or fuel management according to the disaster response information when the additional information is the vehicle management information.

16. An operating method of a vehicle, the method comprising:
identifying, by a notification type determination device, a type of a text message received through a communication terminal;
determining, by the notification type determination device, a notification type of the text message when it is identified that the type of the text message is a public warning text;
analyzing, by a notification content determination device, a text string of the text message when it is identified that the type of the text message is the public warning text;

determining, by the notification content determination device, notification content associated with the text message;

detecting disaster information included in the text string;

determining whether to provide additional information associated with the disaster information; and outputting, by an output device, a notification to a passenger depending on the notification type and the notification content.

17. The method of claim 16, wherein the method further comprises:

identifying the type of the text message depending on a transmission identifier of the text message;

classifying importance of the text message depending on the transmission identifier; and determining the notification type of the text message depending on the importance.

18. The method of claim 16, wherein the method further comprises:

detecting the disaster information including at least one of disaster type information, disaster occurrence location information, or disaster response information;

comparing the disaster information with driving information about the vehicle; and determining the notification content depending on a comparison result, wherein the driving information about the vehicle includes at least one of a current location of the vehicle, a destination of the vehicle, or a home location of the passenger.

19. The method of claim 16, wherein the disaster information includes at least one of disaster type information, disaster occurrence location information, or disaster response information; and wherein the method further comprises:

adding the additional information to the notification content when the additional information is provided, wherein the additional information includes at least one of related news information, weather information, or vehicle management information.

20. A vehicle comprising:

a communication device configured to access a communication terminal over a network;

a notification type determination device configured to:
 receive a public warning text received through the communication terminal; and
 determine a notification type of the public warning text depending on a transmission identifier of the received public warning text;

a notification content determination device configured to:
 analyze a text string of the public warning text;
 detect disaster information including at least one of disaster type information, disaster occurrence location information, or disaster response information; and
 determine notification content depending on the disaster information; and an output device configured to output a notification to a passenger depending on the notification type and the notification content, wherein the notification content includes at least one of a proposal for changing a driving route of the vehicle, a proposal for managing the vehicle, or a proposal for related information about the public warning text.

* * * * *